Dec. 24, 1963  D. W. ENOCH ET AL  3,115,104
TURNOVER CAKE AND METHOD OF MAKING THE SAME
Original Filed June 8, 1959
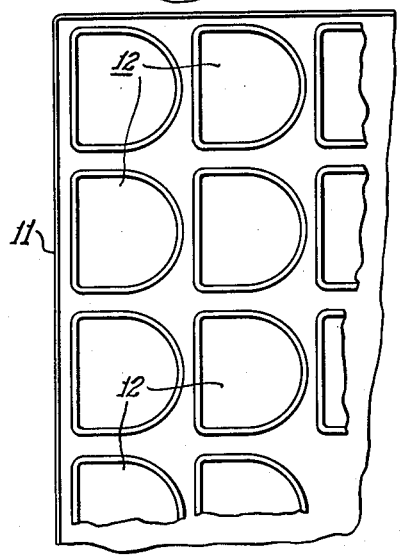
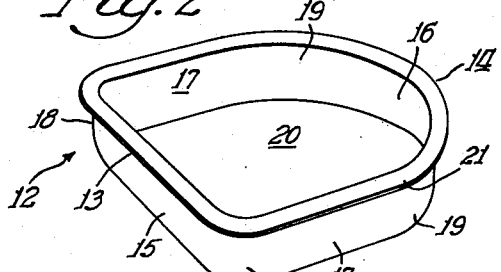
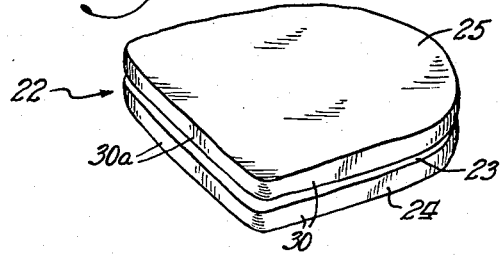
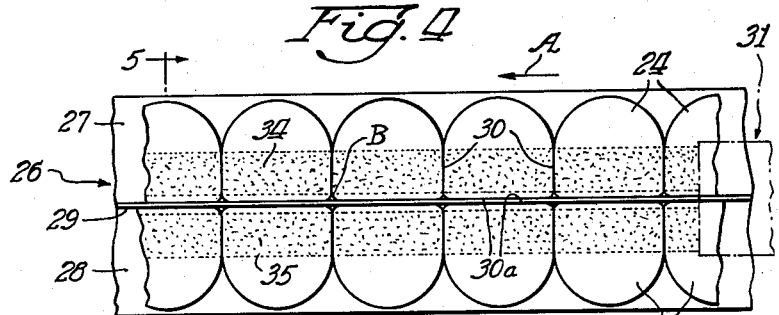
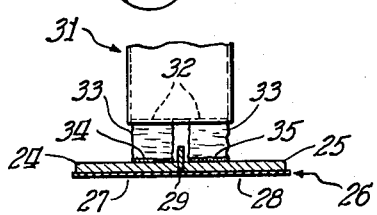
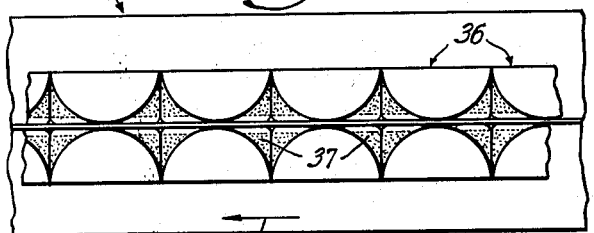
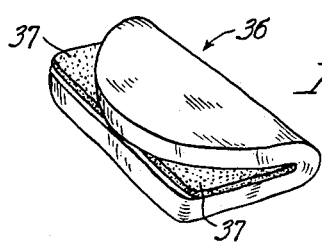
Inventors:
Duard W. Enoch
Joseph F. Bogner and
Elwood A. Jewell, Jr.
By: Jones, Darbo + Robertson Attys.

3,115,104
TURNOVER CAKE AND METHOD OF
MAKING THE SAME
Duard W. Enoch, Kansas City, Mo., and Joseph F. Bogner, Kansas City, and Elwood A. Jewell, Jr., Prairie Village, Kans., assignors to Interstate Bakeries Corporation, Kansas City, Mo., a corporation of Delaware
Original application June 8, 1959, Ser. No. 818,924. Divided and this application June 4, 1962, Ser. No. 202,345
3 Claims. (Cl. 107—54)

This invention relates to a method of making turnover cakes such as are known in the trade as Boston cream cakes or pies, and includes the provision of a novel pan therefor and product thereof.

Heretofore, in the making of such bakery products, made in circular pans, the cakes could not be aligned for the automatic deposit of filling thereon in a continuous stripe without having the filling drop between the abutting cake edges, due to the small region of contact of the circular cakes. Automatic deposit of the filling was thereby practically impossible. The present invention remedies this by the novel concept of baking the cake in a pan having one end of rectangular shape and another communicating end of partially circular shape. By this means the cake parts which are baked in the rectangular ends of the pan may be aligned on a conveyor belt, end to end, thereby providing a line abutting contact between the cakes so that a stripe of filling may be deposited on the end-to-end row of cake without a waste of the filling between the latter. At the same time, the partially circular ends of the cakes may be folded onto the previously mentioned end to partially cover the filling and presenting the appearance of a conventional turnover bakery product with enough of the filling in view to make the product attractively appetizing.

The invention will be understood by reference to the accompanying drawings, showing an illustrative embodiment thereof and method steps employed therewith, and in which drawings—

FIGURE 1 is a fragmentary plan view of a portion of a pan gang for practicing the present invention;

FIGURE 2 is an enlarged perspective view of one of the individual pans included in the pan gang of FIG.1;

FIGURE 3 shows a cake body baked in and to the shape of the pan of FIG. 2, the cake body being shown sliced to make two duplicate halves;

FIGURE 4 is a plan section of illustrative conveyor means with the duplicate halves similar to that shown in FIG. 3 aligned thereon, this being a reduced view;

FIGURE 5 is a cross-section taken on the line 5—5 of FIG. 4;

FIGURE 6 is a view of the conveyor in a later position thereof in which the partially circular cake ends have been folded onto the rectangular ends; and FIGURE 7 is an enlarged perspective view of one of the completed cakes, enlarged as to FIGS. 4, 5, and 6 but on the scale of FIGS. 2 and 3.

Referring in detail to the illustrative construction and method steps shown in the drawing, the numeral 11 indicates a frame for a gang of cake pans 12 following the present invention. The pans 12 may be suitably secured together and to the frame 11 to make up the pan gang as is well known in the art and need not be here further described.

In accordance with the present invention, each pan 12 is of novel shape or configuration having a rectangular end 13 and an arcuate or partially circular end 14, these ends communicating unrestrictedly. The rectangular end 13 is made up of a relatively long straight wall 15 while the arcuate end 14 is in this instance made up of a semi-circular wall 16. Between the walls 15 and 16 are the straight end walls 17, one at each end of the straight side wall 15 and right-angularly related thereof, as at the approximately square corners 18, and merging into the arcuate or semi-circular wall 16 as at 19. The pan of course has the usual bottom 20, and the wall just referred to, for convenience of construction and handling, have the overhanging margin 21 that is continuous about the pan. As shown in the drawing, and for reasons which will become clear as this description proceeds, the pan is relatively shallow to produce a cake body having the relative dimensions shown in FIG. 3. To carry out the purposes of the invention, the straight end walls 17 of the pan are approximately equal in length to the radius of curvature of the arcuate end 14.

A suitable quantity of cake dough to be baked is placed in each of the pans 12 of the gang 11, in any suitable manner which need not be here described, and, after rising and baking, during which process the dough assumes the shape of the pan 12, the individual cake bodies are removed from the pans. Such a cake body is shown at 22 (FIG. 3), this cake body being here indicated as having been sliced through at 23 by means which is well known in the art and which need not be here further described. The slice 23, being in the plane of the somewhat flat cake body 22, makes two duplicate thin half cake bodies 24 and 25, these being symmetrically identical and both having the shape of the pan 12.

Next, the cake bodies are placed, for example, on a movable conveyor 26, which is shown split longitudinally to have the parallel runs 27 and 28. Between the conveyor runs 27 and 28 is a divider or guide strip 29 that preferably moves with the conveyor 26, the guide strip 29 upstanding medially and longitudinally therealong.

In placing the cake bodies 22 on the conveyor 26, the cake body halves 24 and 25 are separated, the cake body half 24 in this instance being placed on the conveyor run 27 and the cake body half 25 on the conveyor run 28. The cake body halves 24 have their straight ends 30, which correspond to the straight ends 17 of the pan, abutted end-to-end along one side of the conveyor divider strip 29, and, similarly, the cake halves 25 have their straight ends 30 abutted end-to-end along the other side of the conveyor divider strip 29 on the conveyor run 28. The halves 24 and 25 are conveniently aligned transversely of the conveyor. The long sides 30a of the cake body halves are abutted against the divider strip 29, these sides corresponding to pan side 15.

The conveyor 26 may next be run under a filling container-dispenser 31 (FIG. 5) that may be supplied with a suitable quantity of edible filling generally of a sweetened creamy nature distinguishing in color and character from the edible material of the cake body. In this instance, the conveyor is indicated as running in the direction of the arrow A. The filling dispenser 31 is shown located over the conveyor 26 symmetrically straddling the divider strip 29. The dispenser is provided with the customary dispensing openings in the lower face thereof, there being in this instance a pair of such openings as indicated at 32 aligned transversely of the conveyor and from each of which the filling is discharged as indicated at 33. It will be seen that the discharge openings 32 are separated to an extent just slightly greater than the thickness of the divider strip 29 so that the filling comes down onto the cake halves simultaneously in a continuous stripe 34 for the conveyor run 27 and in a continuous stripe 35 for the conveyor run 28, the stripes 34 and 35 being separated by the divider strip 29 of the conveyor but each being closely adjacent thereto. It will be seen by reason of the rectangular abutting edges 30 of the cake bodies that the filler stripes 34 and 35 do not fall between the cake bodies at any point. The stripes 34 and 35 are of a width, in each direction transversely of the divider strip 29, so that they just cover the rectangular ends of the cake body halves and stop transversely short of the point where the curved ends of the cake bodies, corresponding to the curved ends of the pans 14, begin. The filling is also kept away from the divider 29 and from the rounded corners of the cakes formed by the rounded corners 18 of the pans, as at B (FIG. 4). This makes it feasible and economical to apply the filling mechanically in a continuous stripe as just described.

Finally, at a later position on the conveyor 26, the ends of the cake body halves corresponding to the arcuate end 14 of the pan are folded over onto the rectangular ends of the cakes corresponding to the rectangular ends 13 of the pan as seen in FIG. 6. This may be done manually by an operator positioned on each side of the conveyor. Each cake half body makes an integral cake 36 of the turnover or Boston cream pie variety as illustrated in FIG. 7. The semi-circular layer of the cake provides the visual effect of a turnover. Furthermore, the semi-circular layer only partially covers the cream filling so that portions of the latter are visible as at 37 to add to the attractiveness of the cake as a merchandisable article.

An illustrative method and means having been described, it is to be understood that such changes may be made as fall within the scope of the appended claims without departing from the invention.

This application is a division of application Serial No. 818,924, filed June 8, 1959, and now abandoned.

We claim:

1. The method of making turn-over type cakes, characterized by the steps of, baking a cake body in a pan having a first rectangular end and a second end which is approximately a semi-circle, aligning said first ends touching end to end, spreading filling in a continuous stripe on said aligned first ends, and folding the second ends onto the first ends respectively.

2. The method of making turn-over type cakes, characterized by the steps of, baking a cake body in a pan having a first rectangular end and a second end which is approximately a semi-circle, slicing through said cake bodies respectively to form duplicate half bodies of the same shape, aligning said duplicate half bodies in two rows with their first ends adjacent transversely and the first body ends of each row aligned in contactual end to end relationship, spreading filling in a continuous stripe on said aligned first ends of each row simultaneously, and folding the second ends onto the first ends respectively.

3. A method of making turn-over type cakes, characterized by the steps of, baking a cake body in a pan having at least one rectangular end, aligning said rectangular ends touching end-to-end, spreading filling in a continuous stripe on the said aligned rectangular ends, and folding the other end onto the rectangular end of the cakes respectively.

References Cited in the file of this patent

UNITED STATES PATENTS

| | | |
|---|---|---|
| 748,052 | Doggett | Dec. 29, 1903 |
| 863,447 | Rice | Aug. 13, 1907 |
| 1,587,288 | Dooly | June 1, 1926 |
| 1,814,485 | Moss | July 14, 1931 |
| 1,942,423 | Henry | Jan. 9, 1934 |
| 1,946,495 | Jones | Feb. 13, 1934 |
| 2,037,821 | Prabell | Apr. 21, 1936 |
| 2,135,342 | Jackson | Nov. 1, 1938 |
| 2,495,132 | Remco | Jan. 17, 1950 |
| 2,535,319 | Redinger | Dec. 26, 1950 |
| 2,747,521 | Gardner | May 29, 1956 |
| 2,759,433 | Szadziewicz et al. | Aug. 21, 1956 |
| 2,810,338 | Dawson | Oct. 22, 1957 |